United States Patent
Zaidi et al.

(10) Patent No.: US 10,083,206 B2
(45) Date of Patent: Sep. 25, 2018

(54) VISUALIZATION OF COMBINED TABLE DATA

(71) Applicant: Business Objects Software Limited, Dublin (IE)

(72) Inventors: Huma Zaidi, Delta (CA); Marjolein Visser, Vancouver (CA); Madison Poon, Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 330 days.

(21) Appl. No.: 14/946,549

(22) Filed: Nov. 19, 2015

(65) Prior Publication Data
US 2017/0147643 A1    May 25, 2017

(51) Int. Cl.
*G06F 17/30* (2006.01)

(52) U.S. Cl.
CPC .. *G06F 17/30466* (2013.01); *G06F 17/30398* (2013.01)

(58) Field of Classification Search
USPC ................................................. 707/714, 745
See application file for complete search history.

(56) References Cited

U.S. PATENT DOCUMENTS

| | | | | |
|---|---|---|---|---|
| 5,548,758 A * | 8/1996 | Pirahesh | ........... | G06F 17/30454 |
| 5,557,788 A * | 9/1996 | Inoue | ................ | G06F 17/30595 |
| 5,752,025 A * | 5/1998 | Shakib | .............. | G06F 17/30522 |
| 5,842,209 A * | 11/1998 | Mocek | .............. | G06F 17/30392 |
| 6,016,488 A * | 1/2000 | Bosworth | ......... | G06F 17/30392 |
| 6,353,452 B1 * | 3/2002 | Hamada | ............ | G06F 17/30392 |
| | | | | 707/999.004 |
| 6,356,896 B1 * | 3/2002 | Cheng | ............... | G06F 17/30392 |
| 6,405,205 B1 * | 6/2002 | Hakuba | ............. | G06F 17/30595 |
| 6,640,221 B1 * | 10/2003 | Levine | ............. | G06F 17/30392 |
| 6,704,728 B1 * | 3/2004 | Chang | ............... | G06F 17/30321 |
| 7,613,676 B2 * | 11/2009 | Baisley | ................. | G06Q 10/10 |
| | | | | 706/57 |
| 9,176,860 B2 * | 11/2015 | Wiener | ............... | G06F 12/0246 |
| 9,633,076 B1 * | 4/2017 | Morton | ............. | G06F 17/30466 |
| 9,852,181 B2 * | 12/2017 | Grochowski | ..... | G06F 17/30466 |

(Continued)

*Primary Examiner* — Cam-Linh Nguyen
(74) *Attorney, Agent, or Firm* — Fountainhead Law Group P.C.

(57) ABSTRACT

Embodiments effect the combination of data from different tables (e.g., of an underlying database), and the visualization of that combined table data in an incremental manner. Columns from a second table may be selectively combined with those of a first table, manually by user selection and/or automatically by best guess matching. Such matching may be based upon commonalities between table column headers. A menu may allow user selection of specific table(s)/table column(s) to be combined with a first table, as well as a manner of that combination (e.g., particular types of SQL join operations). The table data combination process is visualized step-by-step (e.g., allowing toggling and forward/backward navigation between interface screens), ensuring the user is able to follow data migration in the combined workflow, and appreciate/recognize changing values resulting therefrom. Particular embodiments may leverage the processing power of an in-memory database engine to accomplish combination and/or visualization of table data.

17 Claims, 15 Drawing Sheets

(56) References Cited

U.S. PATENT DOCUMENTS

| | | | |
|---|---|---|---|
| 2003/0037043 A1* | 2/2003 | Chang | G06F 17/30905 |
| 2003/0055830 A1* | 3/2003 | Gutierrez-Rivas | G06F 17/30392 |
| 2003/0229633 A1* | 12/2003 | Phillips | G06F 17/30392 |
| 2004/0103050 A1* | 5/2004 | Long | G06Q 40/00 705/35 |
| 2007/0061287 A1* | 3/2007 | Le | G06F 17/30306 |
| 2007/0130195 A1* | 6/2007 | Li | G06F 17/30595 |
| 2007/0185895 A1* | 8/2007 | Hogue | G06F 17/30554 |
| 2011/0196857 A1* | 8/2011 | Chen | G06F 17/30457 707/714 |
| 2011/0270844 A1* | 11/2011 | He | G06F 17/30315 707/745 |
| 2012/0011108 A1* | 1/2012 | Bensberg | G06F 17/3033 707/714 |
| 2012/0089347 A1* | 4/2012 | Robleto | G01B 21/32 702/35 |
| 2013/0238621 A1* | 9/2013 | Ganjam | G06F 17/30864 707/737 |
| 2016/0055205 A1* | 2/2016 | Jonathan | G06F 17/30454 707/714 |

\* cited by examiner

| Order ID | Date | Customer | SKU | Product Line | Product | Order Qty | Year | Week No | Order Status |
|---|---|---|---|---|---|---|---|---|---|
| 654345440 | 4/10/15 | Trader Mary's | 654345440 | Granola bar | Dark Chocolate | 3 | 2015 | 15 | Fulfilled |
| 953267288 | 4/10/15 | Trader Mary's | 953267288 | Granola bar | Almond Butter | 1 | 2015 | 15 | Fulfilled |
| 885179369 | 4/10/15 | Trader Mary's | 885179369 | Oatmeal | Almond Crunch | 2 | 2015 | 15 | Fulfilled |
| 329497?? | 4/23/15 | Whole Grain Foods | 329497?? | Fruit & Nut Cracker | Cranberry and Flax Seed | 5 | 2015 | 17 | Fulfilled with delay |
| 593653?4 | 5/14/15 | Whole Grain Foods | 593653?4 | Fruit & Nut Cracker | Ginger Sesame | 7 | 2015 | 17 | Fulfilled with delay |
| 805639?47 | 5/14/15 | Capperberry's | 805639?47 | Granola bar | Field Berry | 2 | 2015 | 19 | Wait to ship |
| 329497?? | 5/31/15 | Capperberry's | 329497?? | Fruit & Nut Cracker | Cranberry and Flax Seed | 1 | 2015 | 19 | Wait to ship |
| 654345440 | 5/31/15 | Trader Mary's | 654345440 | Granola bar | Dark Chocolate | 6 | 2015 | 20 | Wait to ship |

Orders Line Item

| SKU | Product Line | Product | Date | Year | Week No | Actual Cases qty | Planned Cases qty | Order qty |
|---|---|---|---|---|---|---|---|---|
| 6541440 | Granola bar | Dark Chocolate | 5/4/15 | 2015 | 19 | - | 103 | |
| 9532729 | Granola bar | Almond Butter | 5/4/15 | 2015 | 19 | - | 103 | |
| 8056194 | Granola bar | Forest Berry | 5/4/15 | 2015 | 19 | - | 135 | |
| 8294973 | Fruit & Nut Cracker | Cranberry and Flax Seed | 5/4/15 | 2015 | 19 | - | 130 | |
| 9286517 | Fruit & Nut Cracker | Ginger Sesame | 5/4/15 | 2015 | 19 | - | 147 | |
| 9123645 | Oatmeal | Apple Cinnamon | 5/4/15 | 2015 | 19 | - | 139 | |
| 8831778 | Oatmeal | Almond Crunch | 5/4/15 | 2015 | 19 | - | 147 | |
| 4283185 | Oatmeal | Regular | 5/4/15 | 2015 | 19 | - | 146 | |
| 6541440 | Granola bar | Dark Chocolate | 5/11/15 | 2015 | 20 | - | 119 | |

Inventory Plan – May

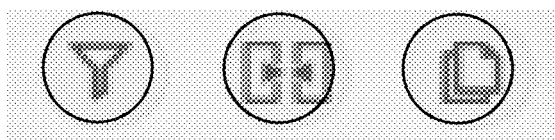
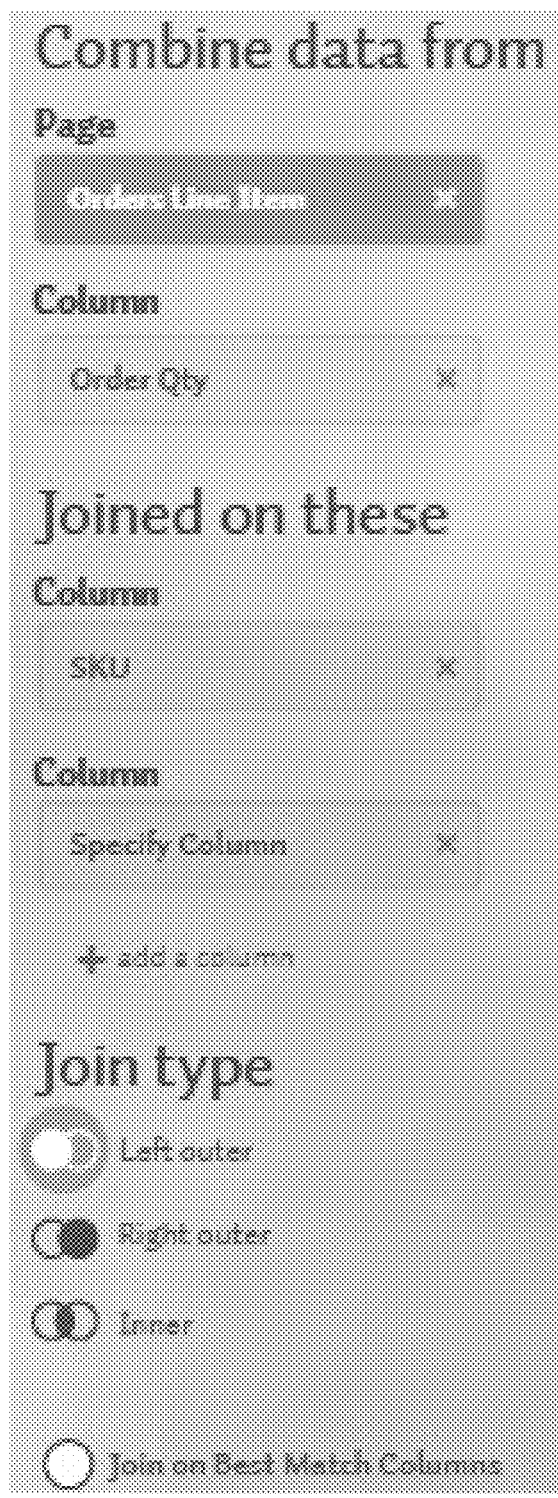
FIG. 9

FIG. 9A

Inventory Plan – May

| SKU | Product Line | Product | Date | Year | Week No | Actual Cases qty | Planned Cases qty | Order qty |
|---|---|---|---|---|---|---|---|---|
| 65414540 | Granola bar | Dark Chocolate | 5/44/15 | 2015 | 19 | - | 103 | 12 |
| 95327298 | Granola bar | Almond Butter | 5/44/15 | 2015 | 19 | - | 108 | 12 |
| 80563947 | Granola bar | Field Berry | 5/44/15 | 2015 | 19 | - | 135 | 19 |
| 22249711 | Fruit & Nut Cracker | Cranberry and Flax Seed | 5/44/15 | 2015 | 19 | - | 110 | 12 |
| 93061174 | Fruit & Nut Cracker | Ginger Sesame | 5/44/15 | 2015 | 19 | - | 147 | 19 |
| 91206450 | Oatmeal | Apple Cinnamon | 5/44/15 | 2015 | 19 | - | 139 | 13 |
| 88579658 | Oatmeal | Almond Crunch | 5/44/15 | 2015 | 19 | - | 147 | 12 |
| 48831850 | Oatmeal | Regular | 5/44/15 | 2015 | 19 | - | 146 | 7 |
| 65414540 | Granola bar | Dark Chocolate | 5/11/15 | 2015 | 20 | - | 139 | 19 |

| SKU | Product Line | Product | Date | Year | Week No | Actual Case qty | Planned Case qty | Order qty |
|---|---|---|---|---|---|---|---|---|
| 654145840 | Granola bar | Dark Chocolate | 5/14/15 | 2015 | 19 | -- | 103 | 92 |
| 951257253 | Granola bar | Almond Butter | 5/14/15 | 2015 | 19 | -- | 108 | 103 |
| 805621847 | Granola bar | Field Berry | 5/14/15 | 2015 | 19 | -- | 125 | 115 |
| 029469711 | Fruit & Nut Cracker | Cranberry and Flax Seed | 5/14/15 | 2015 | 19 | -- | 119 | 117 |
| 923263174 | Fruit & Nut Cracker | Ginger Sesame | 5/14/15 | 2015 | 19 | -- | 147 | 135 |
| 912354433 | Oatmeal | Apple Cinnamon | 5/14/15 | 2015 | 19 | -- | 139 | 124 |
| 823377369 | Oatmeal | Almond Crunch | 5/14/15 | 2015 | 19 | -- | 157 | 121 |
| 483319153 | Oatmeal | Regular | 5/14/15 | 2015 | 19 | -- | 146 | 108 |
| 654145340 | Granola bar | Dark Chocolate | 5/21/15 | 2015 | 20 | -- | 119 | 104 |

FIG. 10A

Inventory Plan – May

VISUALIZATION OF COMBINED TABLE DATA

BACKGROUND

Unless otherwise indicated herein, the approaches described in this section are not prior art to the claims in this application and are not admitted to be prior art by inclusion in this section.

Embodiments relate to interfaces for visualizing table data, and in particular, to methods and apparatuses providing visualization of combined table data.

Databases offer a useful mechanism for storing and analyzing volumes of related data. One common form of database storage is as a table comprising rows and columns.

The ever-increasing power of database technology has resulted in the formation of database tables of larger sizes and greater complexity. However, certain types of information may be stored in one table, while other information may be stored in a different table.

Accurate, insightful analysis of database data may call for combining data present in different tables. Conventionally, combining such table data has required the user to perform a sequence of manual steps to create a separate third table that includes the combined data.

However, performing such manual steps may involve cumbersome toggling between the different original source tables. Moreover, while the user may have limited experience in the underlying structure and operation of the database, the act of forming a third table to combine table data may require implementing complex database operations (e.g., utilizing Structured Query Language—SQL), with which the user may be unfamiliar.

SUMMARY

Embodiments effect the combination of data from different tables (e.g., of an underlying database), and the visualization of that combined table data in an incremental manner. Columns from a second table may be selectively combined with those of a first table, manually by user selection and/or automatically by best guess matching. Such matching may be based upon commonalities between table column headers. A menu may allow user selection of specific table(s)/table column(s) that are to be combined with the first table, as well as a manner of that combination (e.g., particular types of join operations). The table data combination process is visualized step-by-step (e.g., allowing toggling and forward/backward navigation between interface screens), ensuring the user is able to follow data migration in the combined workflow, and appreciate/recognize changing values resulting therefrom. Particular embodiments may leverage the processing power of an in-memory database engine in order to accomplish table data combination and visualization.

An embodiment of a computer-implemented method comprises displaying a first database table, and in response to a first instruction, an engine adding a column to the first database table from a second database table. In response to a second instruction, the engine populates fields of the column with stored values. In response to a third instruction, the engine performs a combination operation of the column with another column of the first database table. In response to a fourth instruction, the engine displays the fields with updated values resulting from the combination operation.

An embodiment of a non-transitory computer readable storage medium includes a computer program for performing a method comprising displaying a first database table, and in response to a suggestion resulting from matching of a second database table, an engine adding a column to the first database table from the second database table. In response to a first instruction, the engine populates fields of the column with stored values. In response to a second instruction, the engine performs a combination operation of the column with another column of the first database table. In response to a third instruction, the engine displays the fields with updated values resulting from the combination operation.

An embodiment of a computer system comprises one or more processors and a software program, executable on said computer system. The software program is configured to cause an in-memory database engine to display a first database table from an in-memory database, add a column to the first database table from a second database table, in response to a first instruction, and populate fields of the column with stored values in response to a second instruction. The software program is further configured to cause the in-memory database engine to perform a combination operation of the column with another column of the first database table in response to a third instruction, and to display the fields with updated values resulting from the combination operation, in response to a fourth instruction.

In some embodiments the first instruction comprises the column recommended by a suggestion component.

In certain embodiments the column is recommended based upon matching a header of the column by the suggestion component.

In particular embodiments the first instruction comprises the column selected by a user.

In various embodiments the first instruction is received from a menu.

In some embodiments the combination operation comprises a Structured Query Language (SQL) join operation.

According to certain embodiments the combination operation specifies a type of the SQL join operation.

In various embodiments the first table is stored in an in-memory database, the second table is stored in the in-memory database, and the engine comprises an in-memory database engine.

In particular embodiments the engine is located in an application.

The following detailed description and accompanying drawings provide a better understanding of the nature and advantages of embodiments.

BRIEF DESCRIPTION OF THE DRAWINGS

FIG. 5 is an interface screen according to an example showing a second table.

FIG. 8A is an interface screen showing a revised table reflecting the menu input of FIG. 8.

FIG. 9 shows further user interaction with the interface menu.

FIG. 9A is an interface screen showing a further revised table reflecting the menu input of FIG. 9.

FIG. 10A is an interface screen showing a further revised table reflecting the menu input of FIG. 10.

DETAILED DESCRIPTION

Described herein are methods and apparatuses configured to provide visualization of combined table data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments effect the combination of data from different tables (e.g., from an underlying database), and visualizing that combined table data in an incremental manner. Columns from another table may be selectively combined with those of an existing table, manually by user selection and/or automatically by best guess matching. Such matching may be based upon commonalities between table column headers. A menu may allow user selection of specific table(s)/table column(s) to be combined with a current table, as well as a manner of that combination (e.g., particular types of join operations). The table data combination process is visualized step-by-step (e.g., allowing toggling and forward/backward navigation between interface screens), ensuring the user is able to follow data migration in the combined workflow, and appreciate changing values resulting therefrom. Particular embodiments may leverage the processing power of an in-memory database engine in order to accomplish table data combination and visualization.

Figure 1:
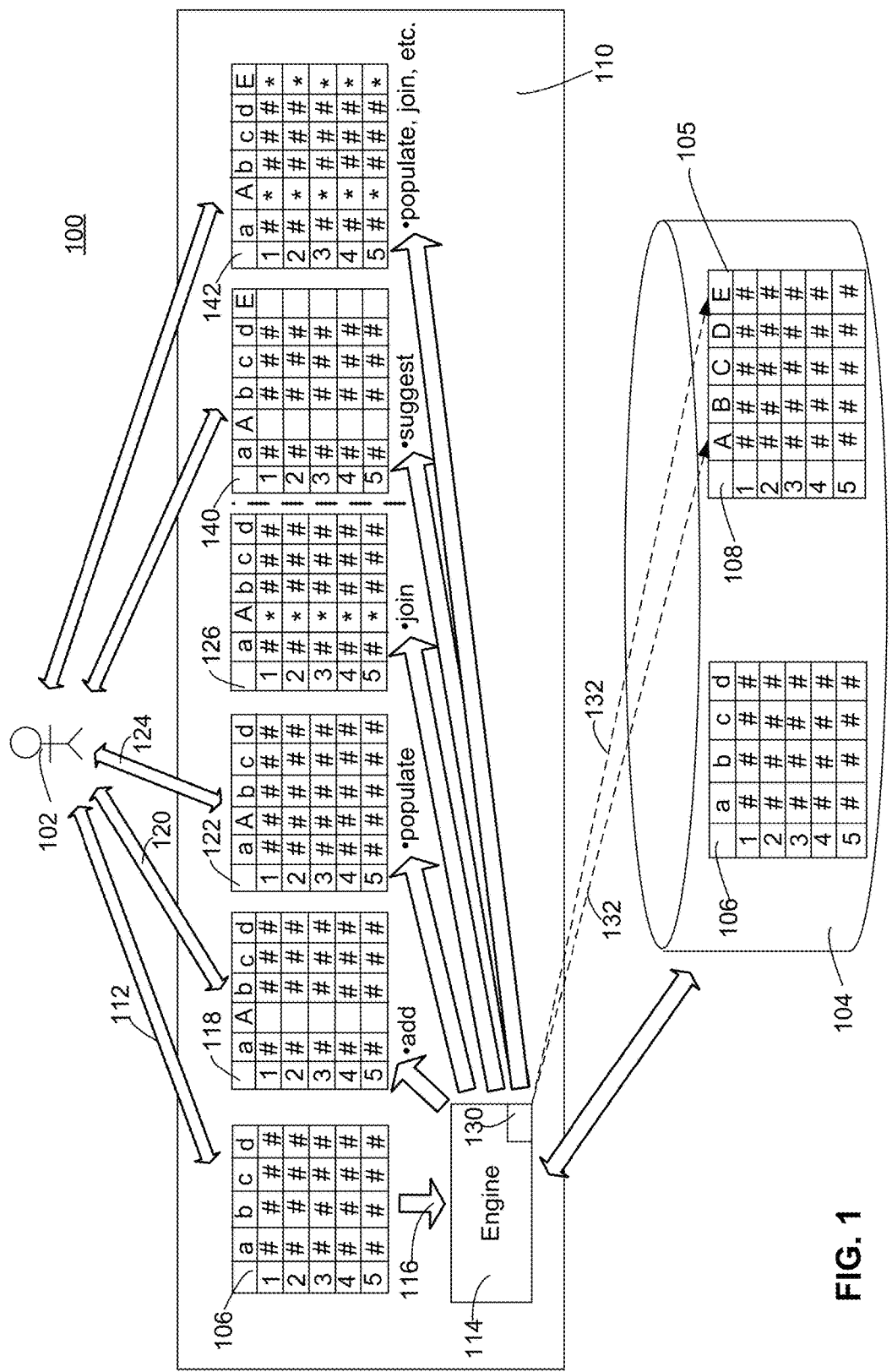
FIG. 1 shows a simplified block diagram of a system according to an embodiment.

FIG. 1 presents a simplified view of a system 100 according to an embodiment. In particular, user 102 is configured to access data of in an underlying database 104, for example as may be resident in a non-transitory computer readable storage medium. Here, the database comprises a first table 106 including columns a-d, and a second table 108 including columns A-E.

Initially, the user seeks to visualize the first table within an application 110. Examples of such applications can include but are not limited to Enterprise Resource Management (ERM) software, Customer Relationship Management (CRM) software, and a wide variety of other types of applications.

Accordingly, in a first interaction 112 the user provides input to the application layer. As a result of that input, the combination engine 114 of the application layer displays the first table. The fields formed from rows and columns of that first table, are populated with original data from the underlying database.

Now, the user seeks to combine data of the first table with the data of the second table. Accordingly, the user provides a second input 116 to the interface engine. As described in detail in the example later below, that input can comprise but is not limited to identification of:

other database table(s) from which data is to be combined;
column(s) of the other database table(s) from which the data is to be combined;
a number of columns that are to be added;
columns whose values are to be combined;
the specific manner of the combination; and
the option of having the system suggest table(s)/column(s) that are to be combined.

Based upon this input, the engine adds a new column to the first table to create a first modified table 118. Here, that added column is column A of the second table.

Initially, the fields of the column A newly added to the first modified table, are not populated with their corresponding original stored values. Rather, they are left blank in order to afford the user with an incremental view of the table combination process.

Next, however, further interaction 120 by the user results in the population of those newly added column fields with the original stored values from the underlying database. This is shown in second modified table 122.

Having added the column as well as now populated it with the original stored values, in a further interaction 124 the user provides instructions detailing the table combination process. As explained in detail below, those instructions can define the specific tables that are to be combined (joined), as well as the manner of that combination (e.g., left outer join, right outer join, inner join).

FIG. 1 shows the further modified first table 126 reflecting the results of combining the table data. That is, the values of the added column have changed from their original values (generically represented as #'s), to new values (generically represented as *'s), thereby reflecting the table combination operation.

Returning to the original first table 106, it is noted that the user has specifically identified the column A of the second table, for addition. However this is not required and certain embodiments may allow the system to provide recommendations of table columns that are to be added.

FIG. 1 thus shows the combination engine 114 as including a suggestion component 130. That suggestion component is designed to reference stored database tables in order to provide recommendations for table(s) and table column(s) that are to be added.

Here, FIG. 1 shows a highly generic example of such a recommendation process, wherein the suggestion component of the combination engine has identified columns A and E of the second table for addition and combination with the data of the existing table.

Those recommendations may be based upon common properties between the data of the first database table and the other tables. In this highly simplified example, interrogation 132 by the suggestion component of the second table column headers indicates two columns that include vowels (A, E). This indicates their potential commonality with the column a (also a vowel) of the first table.

As a result, the suggestion component recommends combining the columns A and E with those of the first table. FIG. 1 thus shows the modified table 140 including those added columns. FIG. 1 also shows the further modified table 142 with the fields of those added columns populated and then updated to reflect the combine operation.

While FIG. 1 shows the combination engine as being located in the application layer overlying a database layer, this is not required. In certain embodiments the combination engine could be implemented as part of the database engine of a database layer. Particular embodiments could thus leverage the processing power of an in-memory database engine in order to serve as the combination engine. One example of such an in-memory database is the HANA in-memory database available from SAP SE of Walldorf, Germany.

And while FIG. 1 shows the suggestion component as part of the combination engine performing the SQL join operation, this is also not required. In some embodiments the suggestion component could be separate from the combination engine. For example, in particular embodiments the suggestion component could be located in a different layer than the combination engine—e.g., where the combination engine is located in the (in-memory) database layer, and the suggestion component is located in an overlying application (or even vice-versa).

Figure 2:
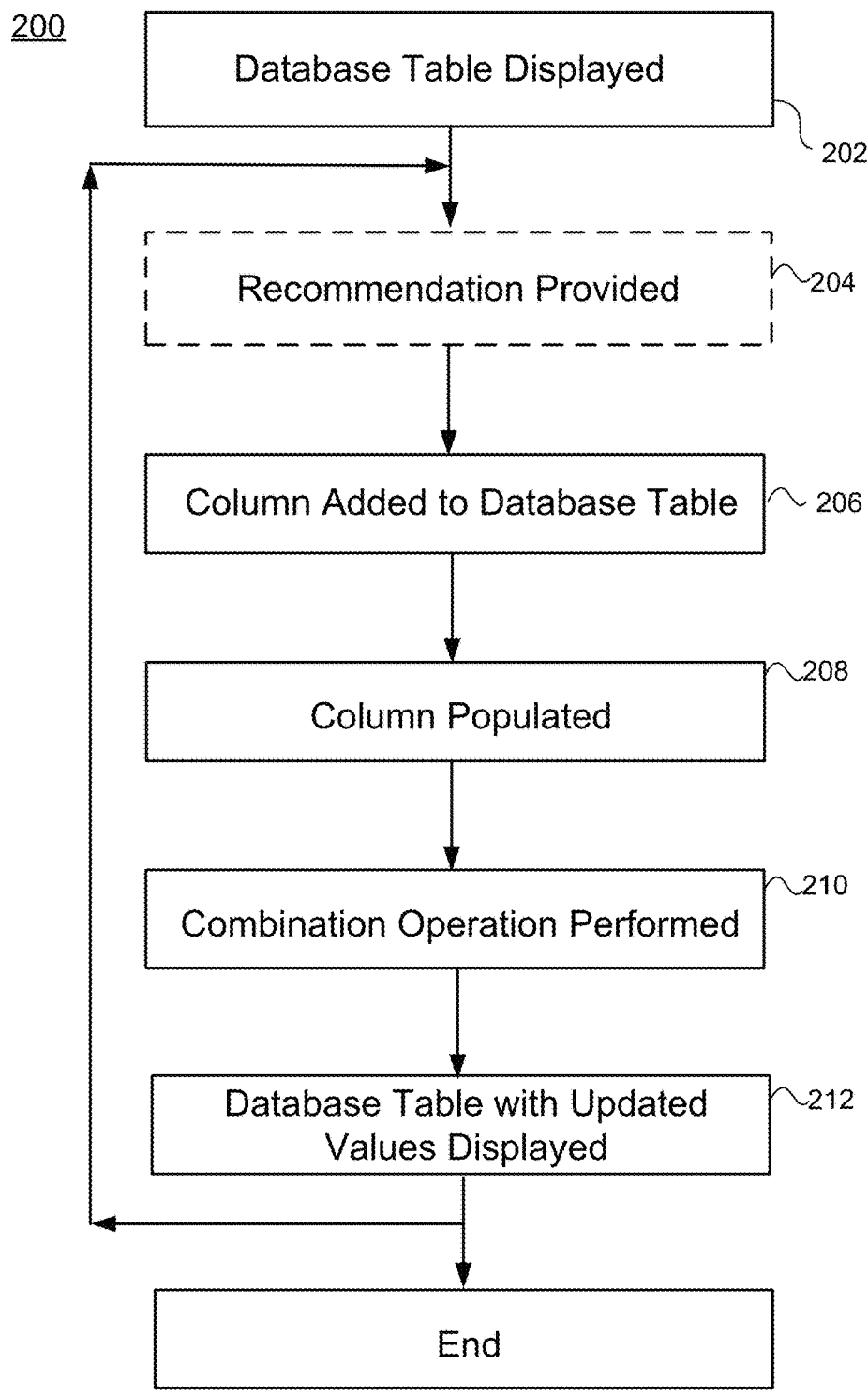
FIG. 2 shows a simplified flow diagram of a method according to an embodiment.

FIG. 2 is a simplified flow diagram showing a method 200 according to an embodiment. In a first step 202, a first table from a database is displayed.

In an optional second step 204, a recommendation of a column of a second database table that is to be combined with first table, is provided. The recommendation is optional because in the next step, a user may directly indicate the column of the second database table.

In a third step 206, an engine adds a column from a second database table to the first table, in response to a first instruction received. That first instruction can comprise a recommendation, or can comprise an instruction received from a user.

In a fourth step 208, the engine populates the fields of the column with original values, in response to a second instruction.

In a fifth step 210, the engine performs a combination operation of the column with another column of the first database table, in response to a third instruction. In sixth step 212, the first table including fields with values updated according to the combination operation, is displayed.

Under certain circumstances, the method may conclude at this point. However, as indicated by the loop in FIG. 2, the method may also be iterative in nature. That is, additional input—including possible recommendation(s)—may then be received by the engine in order to perform further combination and visualization of table data.

EXAMPLE

An example of a system providing visualization of combined table data is now described in connection with FIGS. 3-10A. This specific example shows the visualization of data relating to the sale and distribution of breakfast-type food products (e.g., oatmeal, granola, fruits/nuts), the data for which is present in different tables of an underlying database.

Figure 3:
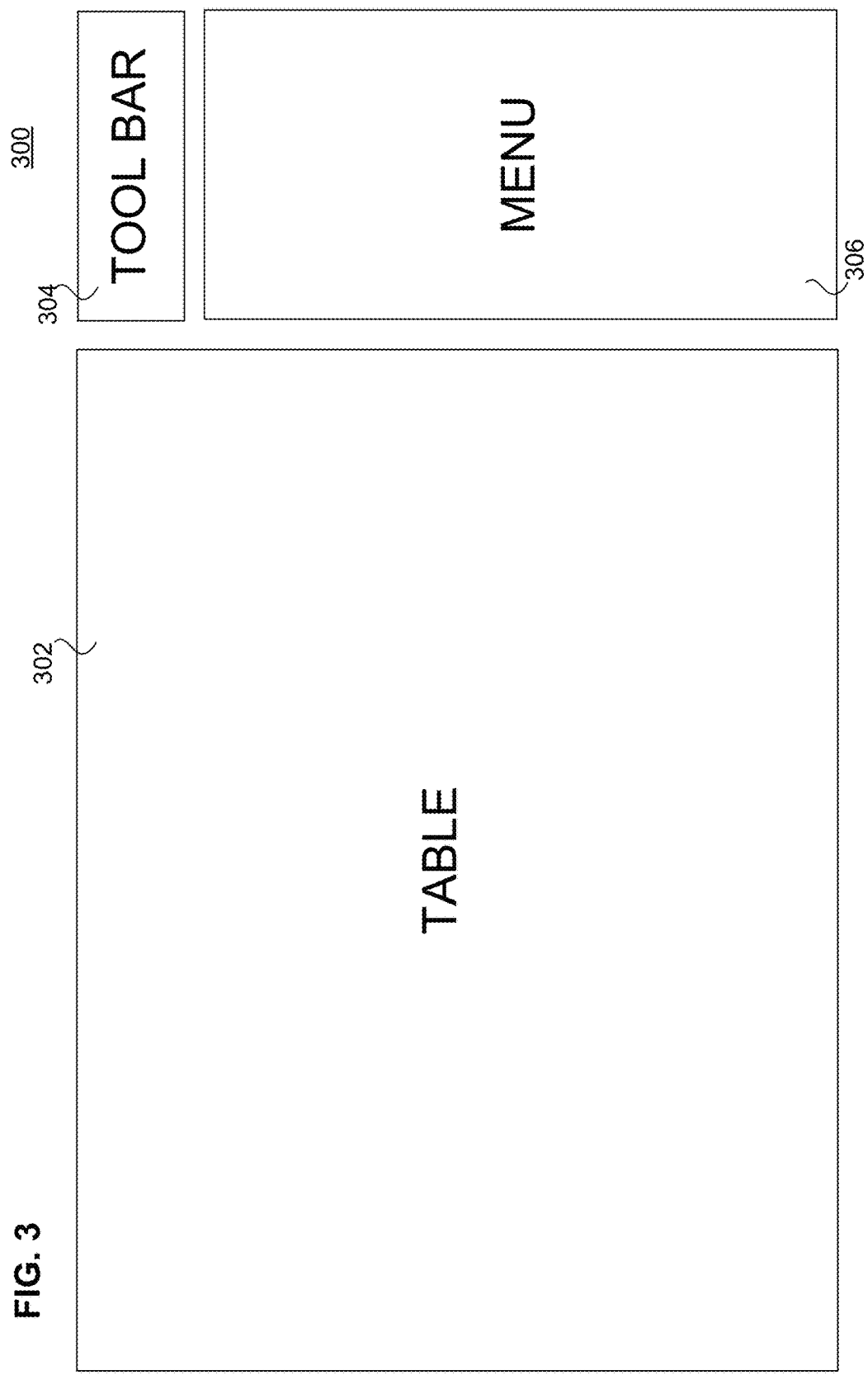
FIG. 3 shows a general format of an interface screen according to a specific example.

FIG. 3 shows a generic user interface 300 comprising a table visualization region 302 and an accompanying tool bar 304 and menu region 306. The following FIGS. 4-10A provide exemplary screen shots of a user interface as depicted generally in FIG. 3.

Figure 4:
FIG. 4 is an interface screen according to an example showing a first table.

FIG. 4 shows the table visualization region for a first stored table—"Inventory Plan—May". This table contains data related to breakfast-type food product inventory.

The table of FIG. 4 shows how many cases of product are planned to be produced in the current year. That information is available in the column having the header "Planned Case Qty".

The user can also access a different data table on another interface page. That 2nd data table—"Orders Line Items", is related to customer orders and is shown in FIG. 5.

The specific table of FIG. 5 indicates how many cases of product are ordered for the current year. That information is available in a column having the header "Order Qty".

In order to perform her job task, a user seeks to be able to easily and rapidly compare certain information of the two different data tables shown in FIGS. 4-5. In particular, the user seeks to visualize the information in column "Planned Case Qty" (FIG. 4) immediately adjacent to the column "Order Qty" (FIG. 5).

Figure 6:
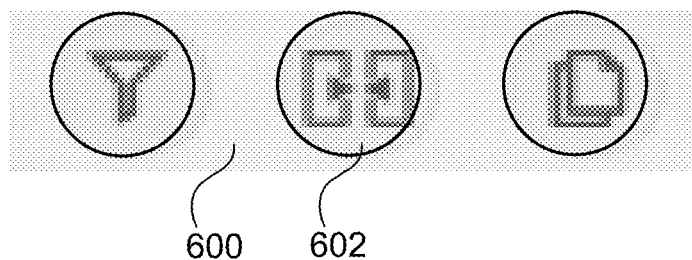
FIG. 6 shows a tool bar according to the interface in the example.

To accomplish such data visualization, the user accesses the tool bar 600 shown in FIG. 6, that is present on the user interface screen with the first table. That tool bar includes a "combine data" icon 602 allowing the combination of data from different tables.

Figure 7:
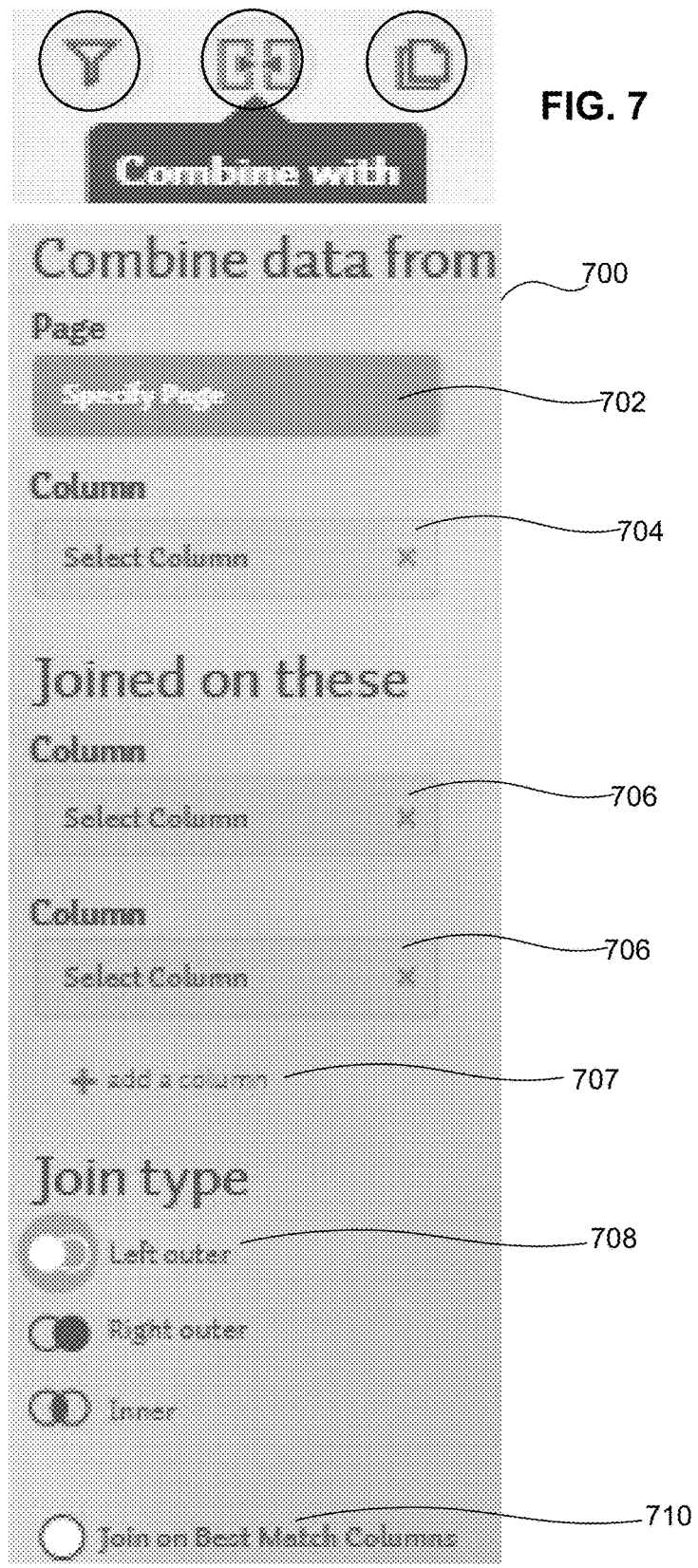
FIG. 7 shows user selection of the tool bar to produce a menu according to the example.

Upon clicking the combine data icon 602, a menu 700 appears as shown in FIG. 7. That menu comprises a plurality of user-fillable fields providing details regarding the table data information that is to be combined.

For example, field 702 allows the user to specify the page (i.e., table) from where data is to be brought in from. Field 704 allows the user to specify the particular column of that page which is to be combined with the first table.

Field(s) 706 allow the user to specify the columns of the first table that are to be combined with the incoming data from the second table. A button 707 allows for the creation of more fields for additional columns.

The panel further includes list 708 allowing a user to select a manner of the combination of table data. Here, the list specifies combination in the form of a type of join operation (e.g., left outer join, right outer join, or inner join) that is to be performed.

Finally, the panel further includes an option 710 allowing the user to perform a join operation on best matching columns, as determined by the system itself. That suggestion functionality is discussed further below.

Figure 8:
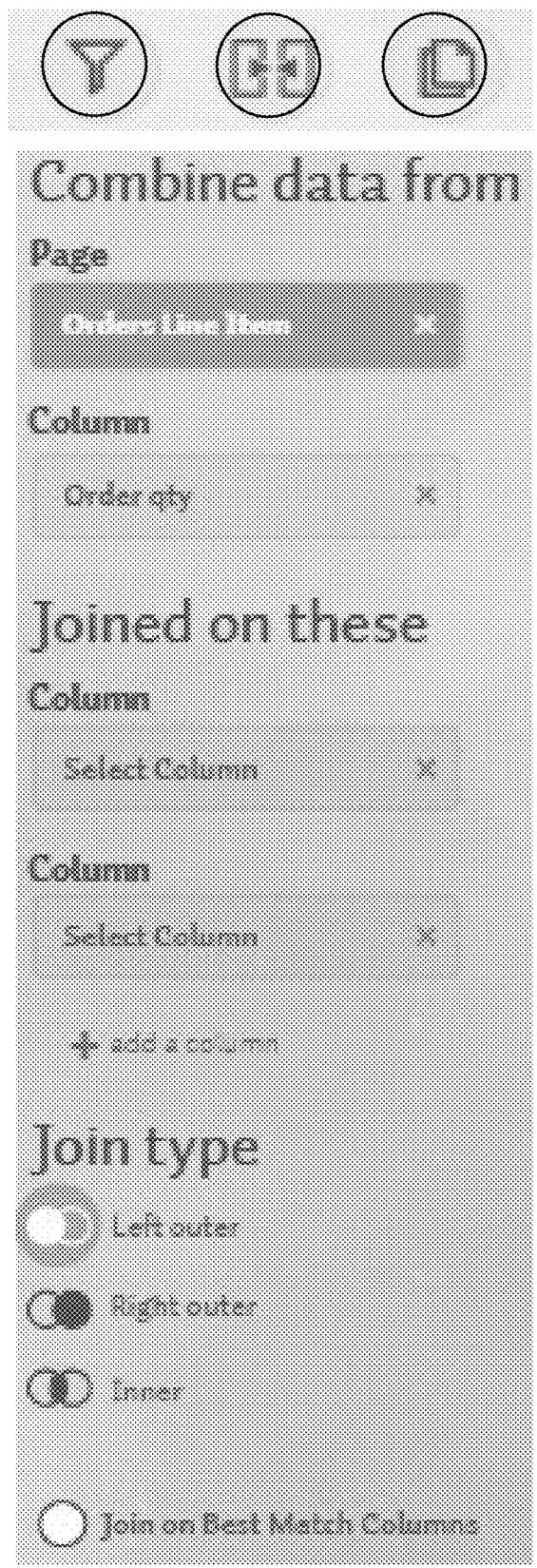
FIG. 8 shows user interaction with the interface menu.

As shown in FIG. 8, in the present example the user first specifies via the menu, that she wishes to bring data into the first table from the "Orders Line Item" page (FIG. 5). Then, the user specifies the column of that page to bring data from (i.e., "Order qty"). The user has also selected that the combination of data is to be accomplished with a left outer join.

As shown in table visualization region of the screenshot of FIG. 8A, once a column is specified, a new column ("Order qty") is inserted into the first table. Helpfully, this change in the table visualization component of the interface affords the user with a preview of the combined workflow.

For example, at this stage in the combine process the position of the new column in the table is shown, but its fields are not yet populated. This incremental visualization approach affords the user with the ability to observe the data manipulation of the table combination, step-by-step. In this manner, the embodiment slows down progression of the combination process, providing the user with visibility into underlying computational processes that may otherwise be invisible.

As shown in the menu of the interface screen of FIG. 9, the user may continue to specify specific column(s) of the first table upon which she wants to perform the join (e.g., "SKU"). Once such a column is specified, the Order qty column updates to show resulting values of the combined workflow. A screen shot including the table with this updated column is shown in FIG. 9A.

Figure 10:
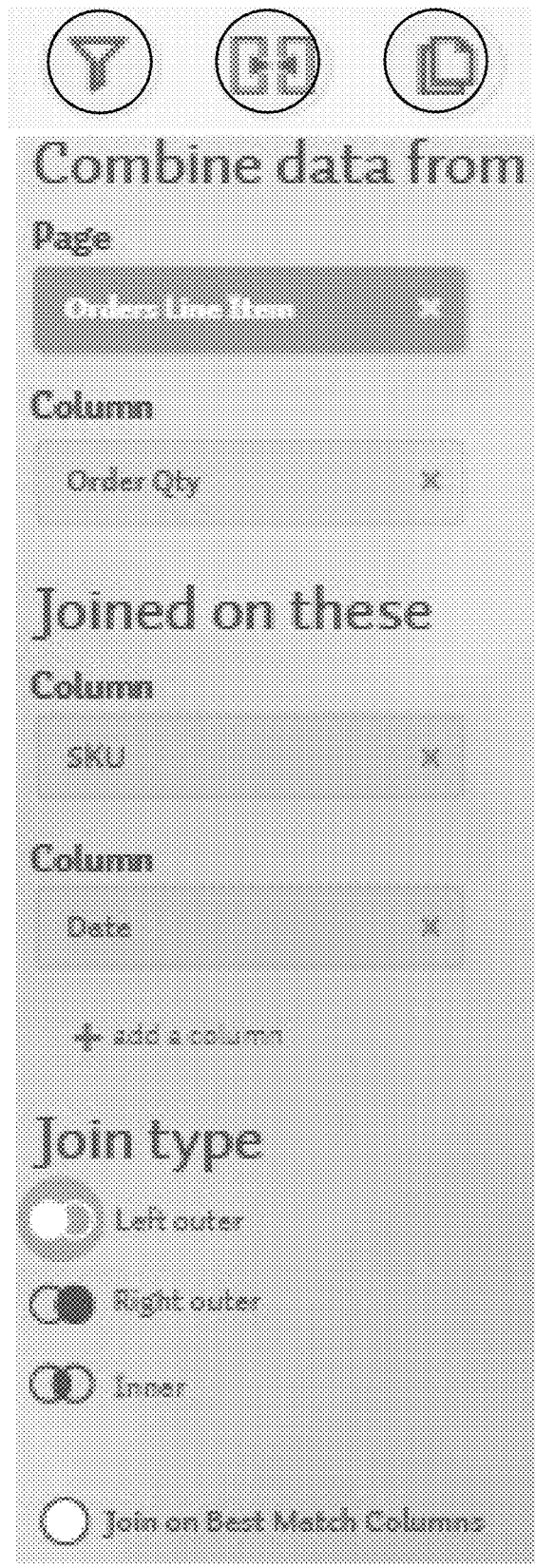
FIG. 10 shows still further user interaction with the interface menu.

At the point in the combine process shown in FIGS. 9-9A, the data is only combined on the Stock Keeping Unit ("SKU") column. However, once the user accesses the menu to select a second column called "Date" (FIG. 10), the table values further update to show (broadened) values resulting from a join operation performed on SKU+Date (FIG. 10A).

Under certain circumstances, a user may not want to specify particular join columns, or may seek additional insight into columns that are to be combined. Thus, the user may be able to click on the "Join on Best Match Columns" button 710 shown in the menu of FIG. 7.

If this option were to be selected, the engine of the application may function to interrogate the columns in Table 1 (FIG. 4) and Table 2 (FIG. 5) to detect shared properties indicating some relation between them. Thus the engine could detect the occurrence of a columns with the same name (or having names sharing common strings), thereby recognizing possible nexus in the benefits of combining those columns (e.g., via a join operation).

For example, both Table 1 and Table 2 have columns that are named "Date", "Year", "Week No", "Product", "Product Line", "SKU". Thus if the "Join on Best Match Columns" menu option is selected according to an embodiment, the application may add one or more of those suggested columns to the table, and then perform a join operation upon these matched columns to present the user with the resulting values.

It is noted that backward/forward buttons may allow the user to readily navigate between interface screens showing the modified tables. The incremental nature of the combine process, together with this ability to toggle between modified tables, affords the user with the ability to quickly recognize/appreciate resulting changes in table values.

Embodiments as described herein may provide one or more benefits in the manipulation and analysis of data stored in an underlying database. For example, embodiments may offer a user preview steps that occur as part of the combine process.

A user thus knows from the beginning of the process, which column is to be brought in from another table, and where that column is to be added in an existing table. Subsequently, when the user decides upon a particular column on which to perform a join operation, the engine can provide an update, and column fields may be changed to reflect the latest values.

In accordance with this "step-by-step" approach to visualizing table combination activities, embodiments may allow a user to easily toggle/move backward and forward within the steps of the process. This toggling/movement is quickly reflected by the changing interface screen. Thus the user can remain oriented, appreciating the location and timing of significant changes in column values arising as a result of the data combining process.

As discussed above, a user may also click a button to perform an automatic combine workflow. That is, clicking on the "Best Match" columns suggested by the engine may result in scanning for columns sharing a name (or portion thereof), and/or the same type of value (e.g., text or number). Moreover other bases for matching resulting in the generation of a recommendation, are possible.

Furthermore, certain embodiments may leverage the processing power available to a database engine, in order to perform the table combination and visualization function. Thus while FIG. 1 shows the suggestion engine as part of an application layer overlying a database layer, this is not required. In certain embodiments, the suggestion engine may be implemented by a database engine, such as an in-memory database engine.

Thus tables that are combined according to embodiments may be configured to reference data stored in a database (e.g., a relational-type database). The database can be an in-memory type database in which data is stored in Random Access Memories (RAMs), for example the HANA in-memory database available from SAP SE of Walldorf, Germany. Other specific types of in-memory type databases can include but are not limited to the SYBASE IQ database also available from SAP SE; the Microsoft Embedded SQL for C (ESQL/C) database available from Microsoft Corp. of Redmond, Wash.; and the Exalytics In-Memory database available from Oracle Corp. of Redwood Shores, California.

Figure 11:
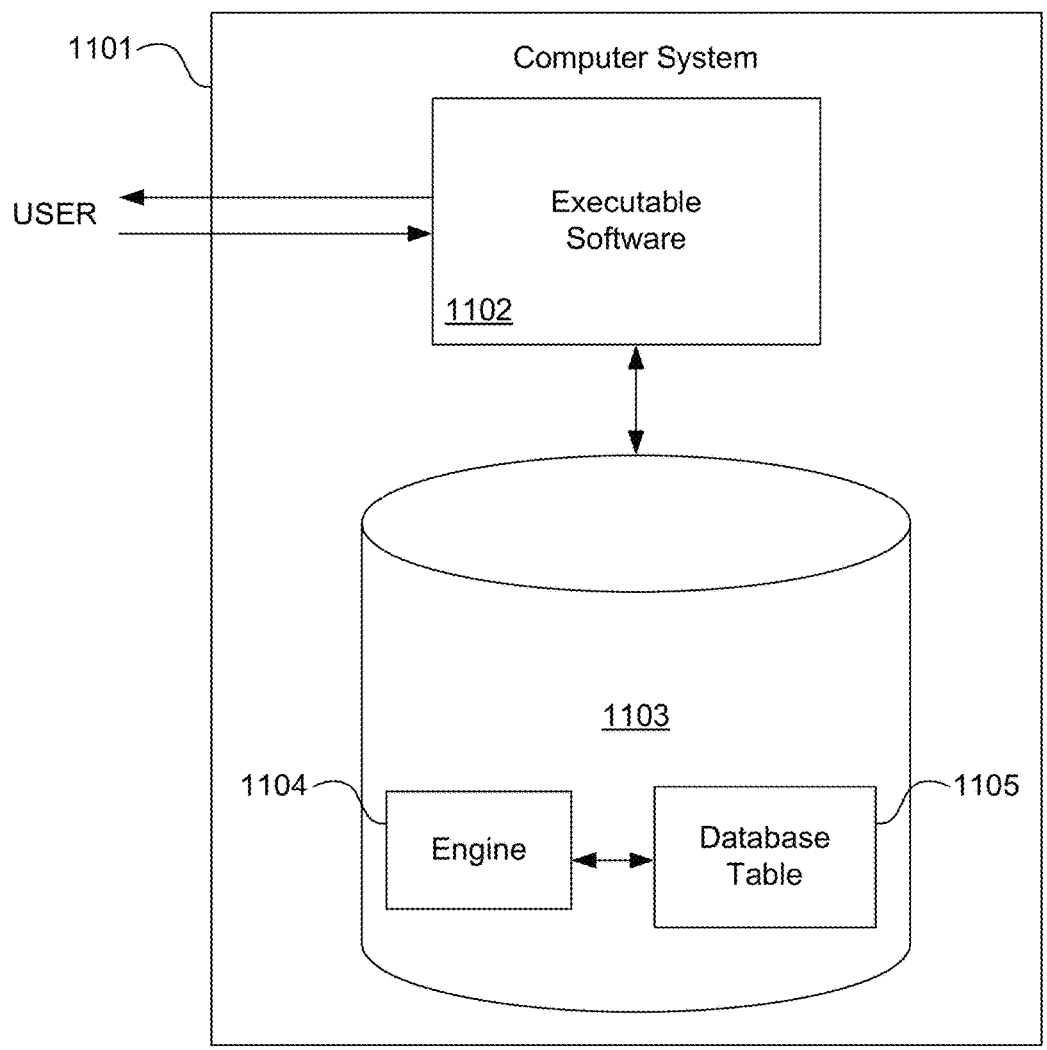
FIG. 11 illustrates hardware of a special purpose computing machine configured to provide visualization of combined table data according to an embodiment.

FIG. 11 illustrates hardware of a special purpose computing machine configured to provide visualization of combined table data according to an embodiment. In particular, computer system 1101 comprises a processor 1102 that is in electronic communication with a non-transitory computer-readable storage medium 1103. This computer-readable storage medium has stored thereon code 1105 corresponding to database table data. Code 1104 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 11, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 12:
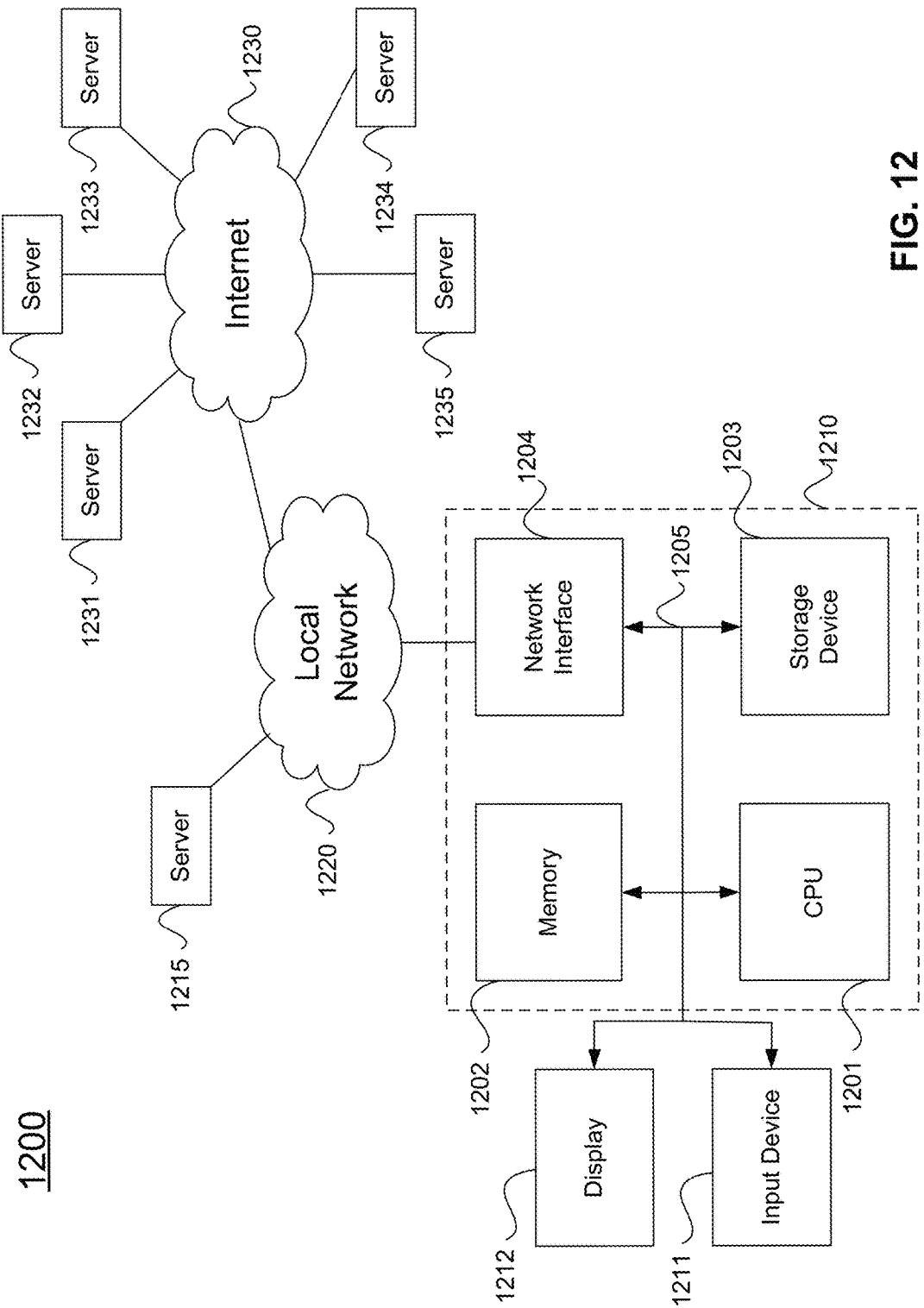
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    displaying a first database table from an in-memory database;
    in response to a first instruction, an in-memory database engine of the in-memory database adding a column to the first database table from a second database table stored in the in-memory database, wherein fields of the column are blank, and the first instruction comprises the column recommended by a suggestion component;
    in response to the second instruction, the in-memory database engine populating the fields of the column with stored values;
    in response to a third instruction, the in-memory database engine performing a combination operation of the column with another column of the first database table; and
    in response to a fourth instruction, the in-memory database engine displaying the fields with updated values resulting from the combination operation.

2. A method as in claim 1 wherein the column is recommended based upon matching a header of the column by the suggestion component.

3. A method as in claim 1 wherein the first instruction is received from a menu.

4. A method as in claim 1 wherein the combination operation comprises a Structured Query Language (SQL) join operation.

5. A method as in claim 4 wherein the combination operation specifies a type of the SQL join operation.

6. A method as in claim 1 wherein adding the column to the first database table comprises including a column header.

7. A non-transitory computer readable storage medium embodying a computer program for performing a method, said method comprising:
    displaying a first database table from an in-memory database;
    in response to a suggestion resulting from matching of a second database table stored in the in-memory database, an in-memory database engine adding a column to the first database table from the second database table, wherein fields of the column are blank;
    in response to a first instruction, the in-memory database engine populating fields of the column with stored values;
    in response to a second instruction, the in-memory database engine performing a combination operation of the column with another column of the first database table; and
    in response to a third instruction, the in-memory database engine displaying the fields with updated values resulting from the combination operation.

8. A non-transitory computer readable storage medium as in claim 7 wherein the suggestion results from matching a header of the column.

9. A non-transitory computer readable storage medium as in claim 7 wherein the suggestion is received from a suggestion component of the engine.

10. A non-transitory computer readable storage medium as in claim 7 wherein the suggestion is received from a suggestion component of an application layer.

11. A non-transitory computer readable storage medium as in claim 7 wherein adding the column to the first database table comprises including a column header.

12. A computer system comprising:
    one or more processors;
    a software program, executable on said computer system, the software program configured to cause an in-memory database engine to:
    display a first database table from an in-memory database;
    add a column to the first database table from a second database table stored in the in-memory database, in response to a first instruction, wherein fields of the columns are blank, and the first instruction comprises the column recommended by a suggestion component;
    populate fields of the column with stored values in response to a second instruction;
    perform a combination operation of the column with another column of the first database table in response to a third instruction; and
    display the fields with updated values resulting from the combination operation, in response to a fourth instruction.

13. A computer system as in claim 12 wherein the column is recommended based upon matching of a header of the column by the suggestion component.

14. A computer system as in claim 12 wherein the suggestion component is part of the in-memory database engine.

15. A computer system as in claim 12 wherein the suggestion component is separate from the in-memory database engine.

16. A computer system as in claim 12 wherein the suggestion component is in an application layer overlying the in-memory database.

17. A computer system as in claim 12 wherein adding the column to the first database table comprises including a column header.

* * * * *